United States Patent
Panteleev et al.

(10) Patent No.: US 10,917,903 B2
(45) Date of Patent: Feb. 9, 2021

(54) USER EQUIPMENT AND METHODS FOR ALLOCATION AND SIGNALING OF TIME RESOURCES FOR DEVICE TO DEVICE (D2D) COMMUNICATION

(71) Applicant: Apple Inc., Cupertino, CA (US)

(72) Inventors: Sergey Panteleev, Nizhny Novgorod (RU); Sergey Sosnin, Zavolzhie (RU); Alexey Vladimirovich Khoryaev, Nizhny Novgorod (RU); Debdeep Chatterjee, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/324,530

(22) PCT Filed: Aug. 7, 2015

(86) PCT No.: PCT/US2015/044214
§ 371 (c)(1),
(2) Date: Jan. 6, 2017

(87) PCT Pub. No.: WO2016/022924
PCT Pub. Date: Feb. 11, 2016

(65) Prior Publication Data
US 2017/0208616 A1     Jul. 20, 2017

Related U.S. Application Data

(60) Provisional application No. 62/034,701, filed on Aug. 7, 2014.

(51) Int. Cl.
*H04W 72/12*     (2009.01)
*H04W 76/14*     (2018.01)
*H04W 72/04*     (2009.01)

(52) U.S. Cl.
CPC ... *H04W 72/1263* (2013.01); *H04W 72/0446* (2013.01); *H04W 76/14* (2018.02)

(58) Field of Classification Search
CPC ......... H04W 72/1263; H04W 72/0446; H04W 76/14; H04W 76/023; H04W 72/12;
(Continued)

(56) References Cited

U.S. PATENT DOCUMENTS

2010/0240312 A1* 9/2010 Peng .................... H04W 72/02
                                                        455/63.1
2011/0164489 A1   7/2011 Papasakellariou et al.
(Continued)

FOREIGN PATENT DOCUMENTS

CN     102365897 A     2/2012
CN     106538022       3/2017
(Continued)

OTHER PUBLICATIONS

"Japanese Application Serial No. 2017-506675, Voluntary Amendment filed Apr. 13, 2018", w English claims, 8 pgs.
(Continued)

*Primary Examiner* — Ricardo H Castaneyra
(74) *Attorney, Agent, or Firm* — Kowert, Hood, Munyon, Rankin & Goetzel, P.C.

(57) ABSTRACT

Embodiments of a User Equipment (UE) and methods for device-to-device (D2D) communication are generally described herein. In some embodiments, the UE may transmit a scheduling assignment (SA) control message that indicates time transmission intervals (TTIs) to be used for a D2D transmission of a data payload by the UE to a receiving UE during an SA cycle. The UE may transmit the data payload during the TTIs indicated in the SA control message. The TTIs used for the transmission of the data payload may be included in a group of D2D TTIs reserved for D2D
(Continued)

transmissions. In some embodiments, a time resource pattern for transmission (T-RPT) may indicate a sequence of TTI indexes for the TTIs used for the transmission of the data payload.

20 Claims, 8 Drawing Sheets

(58) Field of Classification Search
CPC ... H04W 92/18; H04W 56/00; H04W 72/042; H04W 72/04; H04W 72/0406; H04W 72/1278; H04W 76/27; H04W 4/70; H04L 1/1861; H04L 5/1469; H04L 5/0053; H04L 1/1614
See application file for complete search history.

(56) References Cited

U.S. PATENT DOCUMENTS

| | | | |
|---|---|---|---|
| 2013/0107822 A1 | 5/2013 | Papasakellariou et al. | |
| 2013/0148637 A1 | 6/2013 | Yang et al. | |
| 2013/0322277 A1 | 12/2013 | Vanganuru et al. | |
| 2013/0322413 A1* | 12/2013 | Pelletier | H04W 72/1289 370/336 |
| 2015/0055567 A1* | 2/2015 | Narasimha | H04W 76/14 370/329 |
| 2017/0041932 A1* | 2/2017 | Chae | H04W 72/04 |

FOREIGN PATENT DOCUMENTS

| | | |
|---|---|---|
| CN | 108337737 A | 7/2018 |
| KR | 1020170019440 | 2/2017 |
| RU | 2503153 | 12/2013 |
| WO | WO-2013074462 A1 | 5/2013 |
| WO | WO-2013139041 A1 | 9/2013 |
| WO | WO-2013181515 A2 | 12/2013 |

OTHER PUBLICATIONS

"Canadian Application Serial No. 2,954,996, Office Action dated Nov. 6, 2017", 4 pgs.
"International Application Serial No. PCT/US2015/044214, International Search Report dated Nov. 18, 2015", 3 pgs.
"International Application Serial No. PCT/US2015/044214, Written Opinion dated Nov. 18, 2015", 6 pgs.
"Status Report to TSG", Qualcomm Incorporated, RP-140648, 3GPP TSG RAN meeting #64, (Jun. 4, 2014).
"Russian Application Serial No. 2017103925, Office Action dated Feb. 8, 2018", 10 pgs.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, (Dec. 2013), 1-349.
"European Application Serial No. 15830501.1, Extended European Search Report dated Feb. 22, 2018", 13 pgs.
"ENB Controlled Resource Allocation for D2D Communication", 3gpp Draft; R1-142017 Intel—D2dra—Model, 3rd Generation Partnership Project (3GPP), Mobile Competence Centre ; 650, Route Des Lucioles ; F-06921 Sophia-Antipolis Cedex ; France vol. Ran Wg1, No. Seoul, Korea;, (May 18, 2014), 6 pgs.
"International Application Serial No. PCT/US2015/044214, International Preliminary Report on Patentability dated Feb. 16, 2017", 8 pgs.
"Canadian Application Serial No. 2,954,996, Response filed Apr. 30, 2018 to Office Action dated Nov. 6, 2017", 41 pgs.
"Canadian Application Serial No. 2,954,996, Voluntary Amendment filed May 4, 2018", 12 pgs.
"Indian Application Serial No. 201747001200, Voluntary Amendment filed May 7, 2018", w/ English claims, 12 pgs.
"Japanese Application Serial No. 2017-506675, Office Action dated May 22, 2018", W/English Translation, 11 pgs.
"Japanese Application Serial No. 2017-506675, Response filed Aug. 22, 2018 to Office Action dated May 22, 2018", w/ English claims, 10 pgs.
"Korean Application Serial No. 10-2017-7001314, Voluntary Amendment filed May 4, 2018", w/ English claims, 16 pgs.
"On Resource Allocation for D2D Discovery", Intel Corporation, [online], 3GPP TSG-RAN WG1#76 R1-140133, [Online] Retrieved from the Internet: <URL:http://www.3gpp.org/ftp/tsg_ran/WG1_RL1/TSGR1_76/Docs/R1-40133.zip>, (Feb. 14, 2014), 6 pgs.
"Resource Allocation for Mode-1 D2D Operation", 3GPP TSG-RAN WG1#78 R1-142872, [Online] Retrieved from the internet: URL:http://www.3gpp.org/ftp/tsg_ran/WG1_RL1/TSGR1_78/Docs/R1-42872.zip>, (Aug. 22, 2014), 7 pgs.
"Resource Allocation for Mode-2 D2D Operation", Intel Corporation, 3GPP TSG-RAN WG1#78 R1-142871, [Online] Retrieved from the internet: <URL:http://www.3gpp.org/ftp/tsg_ran/WG1_RL1/TSGR1_78/Docs/R1-42871.zip>, (Aug. 22, 2014), 10 pgs.
"Russian Application Serial No. 2017103925, Office Action dated Jun. 15, 2018", w/ English translation, 6 pgs.
"Russian Application Serial No. 2017103925, Response filed May 7, 2018 to Office Action dated Feb. 8, 2018", w/ English claims, 14 pgs.
"Canadian Application Serial No. 2,954,996, Examiners Rule 30(2) Requisition mailed Oct. 18, 2018", 4 pgs.
Office Action in Korean Patent Application No. 10-2017-7001314 dated Aug. 14, 2020, with translation, 12 pgs.
Qualcomm Incorporated, R2-142540, "Signaling Details for ProSe Direct Discovery," 3GPP TSG RAN WG2 #86 (3GPP server publication date: May 9, 2014), 7 pgs.
Samsung, R2-142202, "Discovery Resource Configuration Parameters," 3GPP TSG RAN WG2 #86bis (3GPP server publication date: May 10, 2014), 6 pgs.
Office Action in Brazil Patent Application No. 112017002541-8, dated Jul. 18, 2020, with translation, 6 pgs.

* cited by examiner

USER EQUIPMENT AND METHODS FOR ALLOCATION AND SIGNALING OF TIME RESOURCES FOR DEVICE TO DEVICE (D2D) COMMUNICATION

PRIORITY CLAIM

This application is a U.S. National Stage Filing under 35 U.S.C. 371 from International Application No. PCT/US2015/044214, filed Aug. 7, 2015 and published in English as WO 2016/022924 on Feb. 11, 2016, which claims the benefit of priority to U.S. Provisional Patent Application Ser. No. 62/034,701, filed Aug. 7, 2014, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to device to device (D2D) communication. Some embodiments relate to allocation and signaling of time resources for D2D communication.

BACKGROUND

A wireless network may support communication with mobile devices. In some cases, demand for data throughput for the mobile devices may be high and may even exceed an available system throughput for the network. As an example, the network may support mobile devices located in relatively close proximity to each other, some of which may exchange data with each other through the network. The network may become congested or overloaded in some cases, such as when the number of mobile devices supported becomes large. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
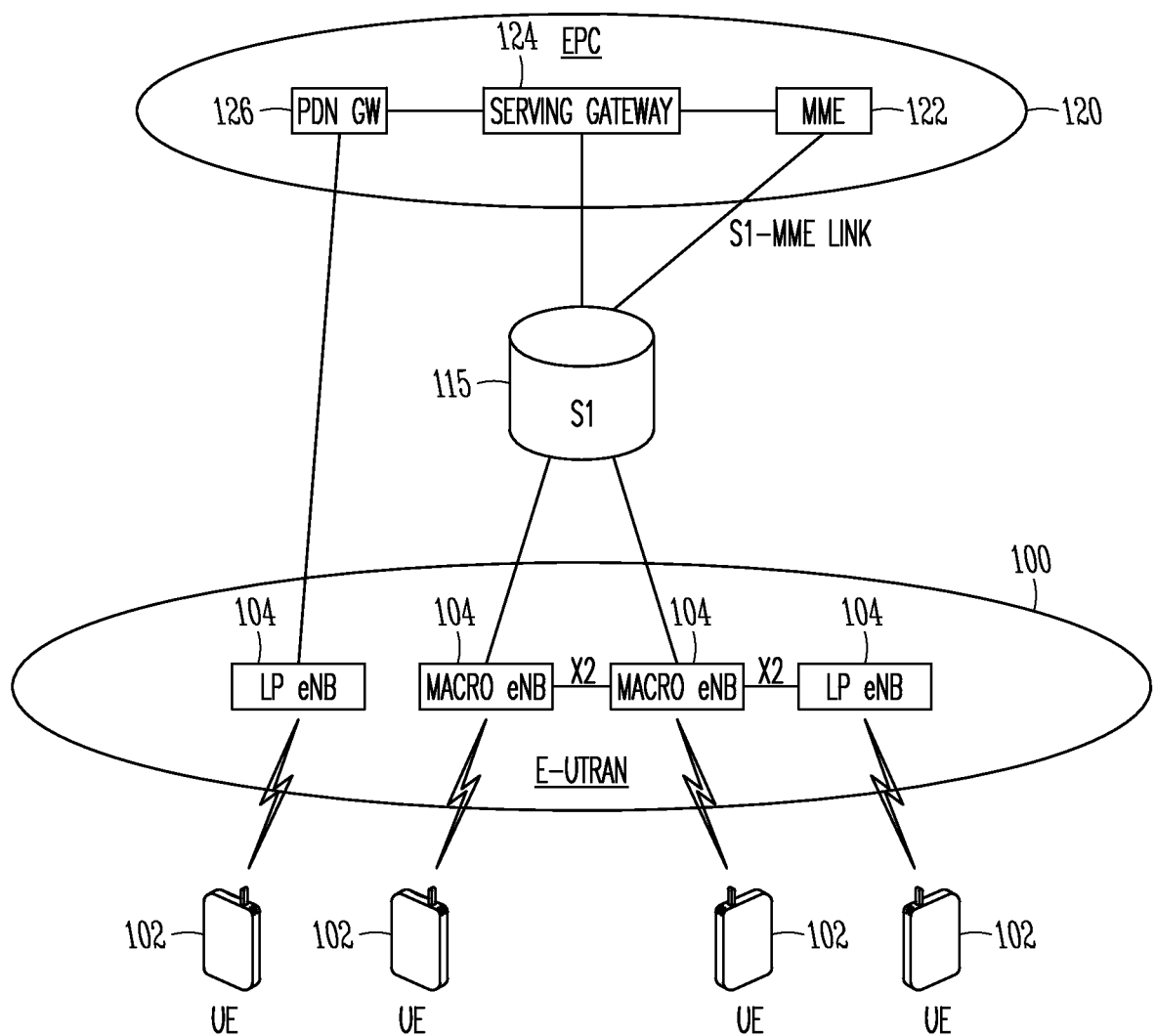
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the UE 102 may transmit a scheduling assignment (SA) control message that indicates time transmission intervals (TTIs) to be used for a D2D transmission of a data payload by the UE 102 to a receiving UE 102 during an SA cycle. The UE 102 may transmit the data payload during the TTIs indicated in the SA control message. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
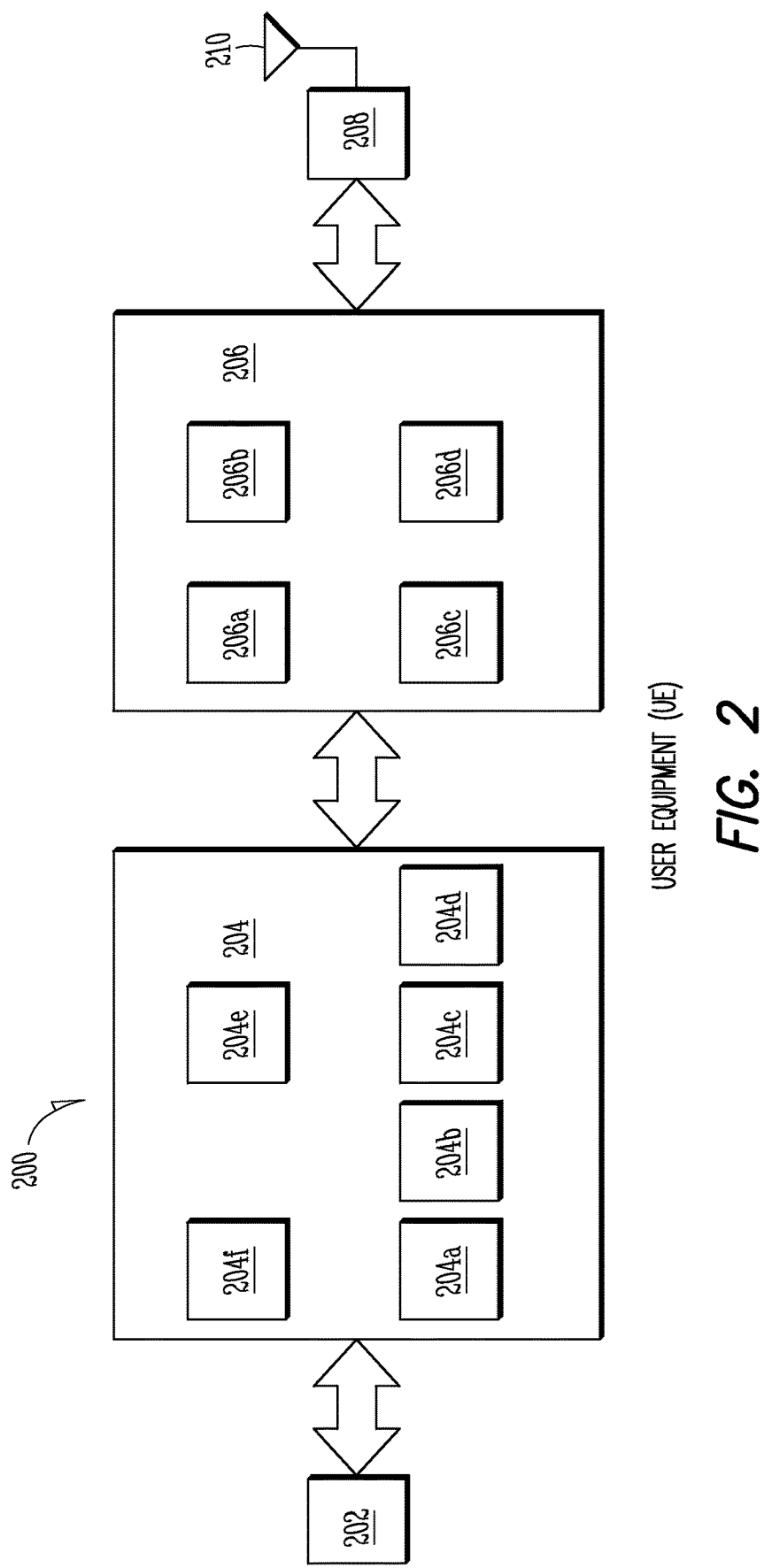
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, some or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, and/or input/output (I/O) interface.

Figure 3:
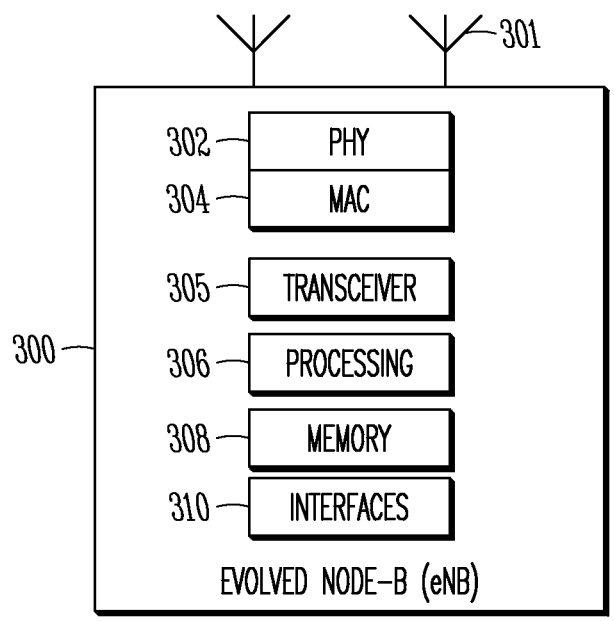
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 and/or eNB 300 may include various components of the UE 200 and/or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

In accordance with embodiments, the UE 102 may transmit a scheduling assignment (SA) control message that indicates time transmission intervals (TTIs) to be used for a D2D transmission of a data payload by the UE 102 to a receiving UE 102 during an SA cycle. The UE 102 may transmit the data payload during the TTIs indicated in the SA control message. The TTIs used for the transmission of the data payload may be included in a group of D2D TTIs reserved for D2D transmissions. In some embodiments, a time resource pattern for transmission (T-RPT) may indicate a sequence of TTI indexes for the TTIs used for the transmission of the data payload. These embodiments are described in more detail below.

Figure 4:
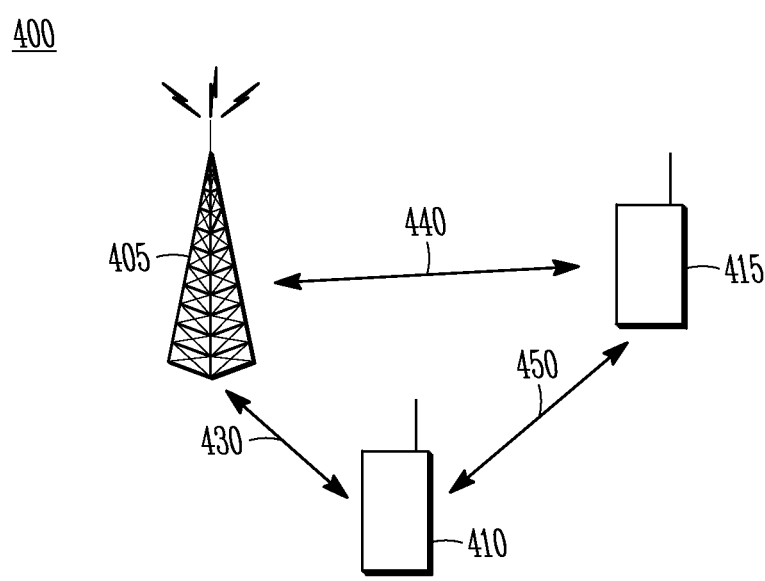
FIG. 4 illustrates an example of a scenario in which UEs may be in communication with an eNB and with each other in accordance with some embodiments.

FIG. 4 illustrates an example of a scenario in which UEs may be in communication with an eNB and with each other in accordance with some embodiments. Although the example scenario 400 shown in FIG. 4 may illustrate some aspects of techniques disclosed herein, it is understood that embodiments are not limited to this example scenario 400. The eNB 405 may be in communication with one or more UEs 410, 415 as part of in-network communication sessions over the links 430 and 440, respectively. The eNB 405 may be an eNB 104 while the UEs 410, 415 may be UEs 102, and the in-network communication sessions may take place over a network such as 100. Techniques and scenarios discussed are not limited to the number or types of eNBs and UEs shown in the example scenario 400, as any suitable number or types may be used. For instance, the eNB 405 is not limited to the tower configuration shown.

In addition to the in-network communication sessions that may be supported by the UEs 410, 415, direct connections between the UEs 410, 415 or other UEs may also be supported. Such communication may be referred to as device-to-device (D2D) communication in some cases. For instance, a D2D communication session between the UEs 410, 415 may take place over the link 450. In some embodiments, D2D communication sessions may be at least partly established through exchanging of control messages and/or other messages between the UEs 410, 415 and the eNB 405. In some cases, in-network and D2D communication sessions may take place simultaneously, but may occur exclusively in other cases.

In some embodiments, time resources, such as time transmission intervals (TTIs) or other time periods, may be reserved for operations used for D2D communication. In addition, channel resources (or frequency resources) may also be reserved in some embodiments, including one or more channels, sub-channels, sub-carriers, resource elements (REs), resource blocks (RBs) or other frequency unit. As an example, time resources and/or channel resources may be reserved by a network such as 100 for exchanging of D2D control messages between UEs 102. As another example, time resources and/or channel resources may be reserved by the network for exchanging of data payloads messages between the UEs 102. Examples of such will be described below.

As an example, a D2D transmission may use multiple TTIs for transmission of one or more data packets. Accordingly, a data packet may be processed using any number of transmitter functions, including but not limited to forward error correction (FEC), scrambling, interleaving and/or bit-to-symbol mapping to produce a group of symbols. The group of symbols may be mapped to the multiple TTIs using any suitable technique such as interleaving, interlacing, repetition and/or others. In addition, a combination of such techniques may also be used to map the group of symbols to the multiple TTIs.

Figure 5:
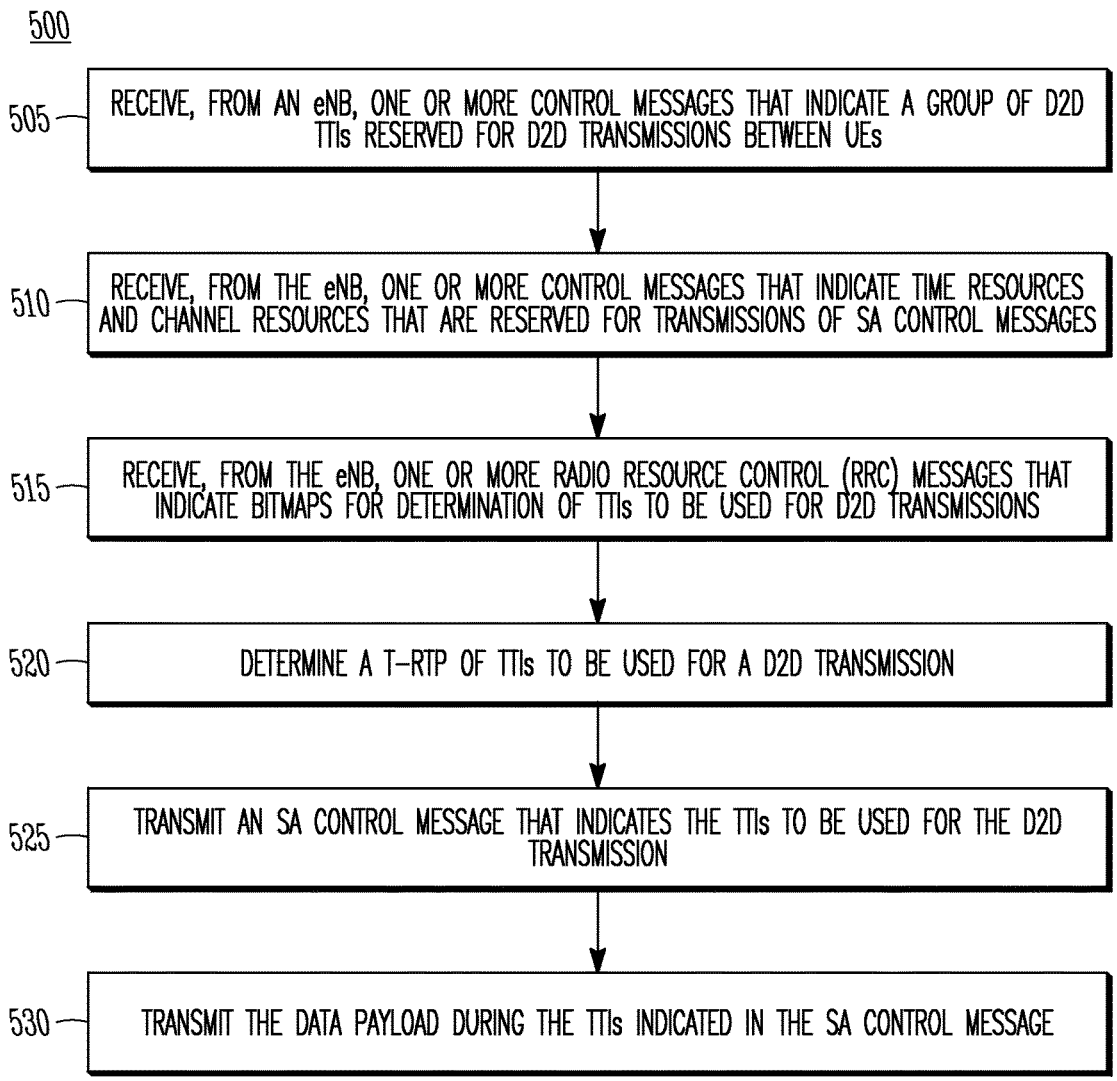
FIG. 5 illustrates the operation of a method of device-to-device (D2D) communication in accordance with some embodiments.

FIG. 5 illustrates the operation of a method of device-to-device (D2D) communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-10, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 may also refer to an apparatus for a UE 102 and/or eNB 104 or other device described above.

At operation 505 of the method 500, the UE 102 may receive, from an eNB 104 configured to operate in a network, one or more control messages that indicate a group of D2D TTIs that may be reserved for D2D transmissions. That is, time resources for the D2D transmissions may be indicated. At operation 510 of the method 500, the UE 102 may receive, from the eNB 104 (or other eNB 104), one or more control messages that indicate time resources and channel resources that are reserved for transmissions of scheduling assignment (SA) control messages to indicate control information for D2D transmissions. Although the communication of the D2D TTIs at operation 505 is shown in FIG. 5 as a separate operation from the communication of the time resources and channel resources at operation 510, some embodiments may combine the two operations. For instance, one or more control messages may include information related to the D2D TTIs and/or the time resources and/or the channel resources.

It should be noted that, in some cases, the D2D TTIs may not necessarily be reserved exclusively for the D2D transmissions, but may be allocated for the D2D transmissions and/or configured to support the D2D transmissions. As a non-limiting example, the D2D TTIs may be reserved and/or allocated by the network 100. In some cases, the time resources and/or the channel resources for the SA control message transmissions may not necessarily be reserved exclusively for the SA control message transmissions, but may be allocated for the SA control message transmissions and/or configured to support the SA control message transmissions. As a non-limiting example, the time resources and/or the channel resources for the SA control message transmissions may be reserved and/or allocated by the network 100.

In some embodiments, the control messages used at operations 505 and 510 may include radio resource control (RRC) messages that may be included in 3GPP or other standards. These embodiments are not limiting, however, as other suitable control messages may be used in some embodiments.

At operation 515, one or more control messages that indicate a group of predetermined bitmaps may be received at the UE 102 from the eNB 104. As a non-limiting example, RRC messages may be used. In some embodiments, the group of bitmaps may be used for operations such as determination of TTIs to be used for D2D transmissions. Examples of such will be given below. It should be noted that additional information and/or parameters may be included in such control messages to enable UEs 102 to determine the TTIs for the D2D transmissions. In addition, although operation 515 describes a separate communication of information for determination of the TTIs for the D2D transmissions, some of that information may also be included in other control messages, such as those transmitted as part of operations 505 and/or 510.

At operation 520, a time resource pattern for transmission (T-RPT) for the transmission of a D2D message may be determined. In some embodiments, the T-RPT may indicate a sequence of TTI indexes to be used for the transmission of the D2D message. At operation 525, an SA control message that indicates the TTIs to be used for the D2D transmission may be transmitted. The SA control message may enable the receiving UE 102 to determine and/or generate the T-RPT, in some cases. In some embodiments, the SA control message may be transmitted in the time resources and channel resources that are reserved for SA control message transmissions as previously described. In some embodiments, the transmission of the SA control message to the receiving UE 102 may be performed as a D2D transmission. Several examples of operations 520 and 525 will be described below.

Figure 6:
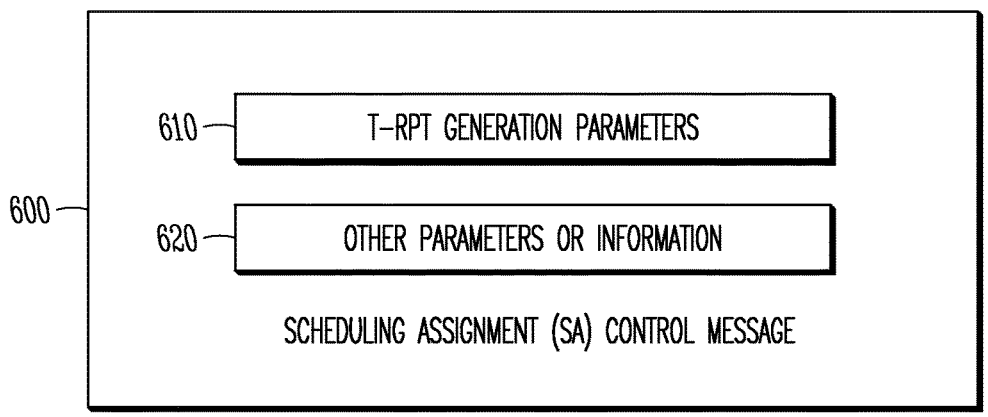
FIG. 6 illustrates an example of a scheduling assignment (SA) control message in accordance with some embodiments.

FIG. 6 illustrates an example of a scheduling assignment (SA) control message in accordance with some embodiments. The example SA control message 600 shown in FIG. 6 may be used to illustrate concepts associated with the method 500 and/or other methods, but the scope of the embodiments is not limited by this example. In addition, formats and arrangements of the SA control message 600 and parameters as shown in FIG. 6 are also not limiting. Referring to FIG. 6, the SA control message 600 may include one or more T-RPT generation parameters 610 that may indicate the TTIs to be used for the D2D transmission and/or the T-RPT used for the D2D transmission. In some embodiments, such an indication may not be explicit and may enable the receiving UE 102 to determine and/or generate the T-RPT for usage in receiving the D2D transmission. In the examples below, some of the parameters 610 that may be included will be described. It should also be noted that the SA control message 600 may also include any number (including zero) of other parameters, information or data blocks 620, which may or may not be related to D2D communication or to techniques and operations described herein. For instance, control information may be included.

Figure 7:
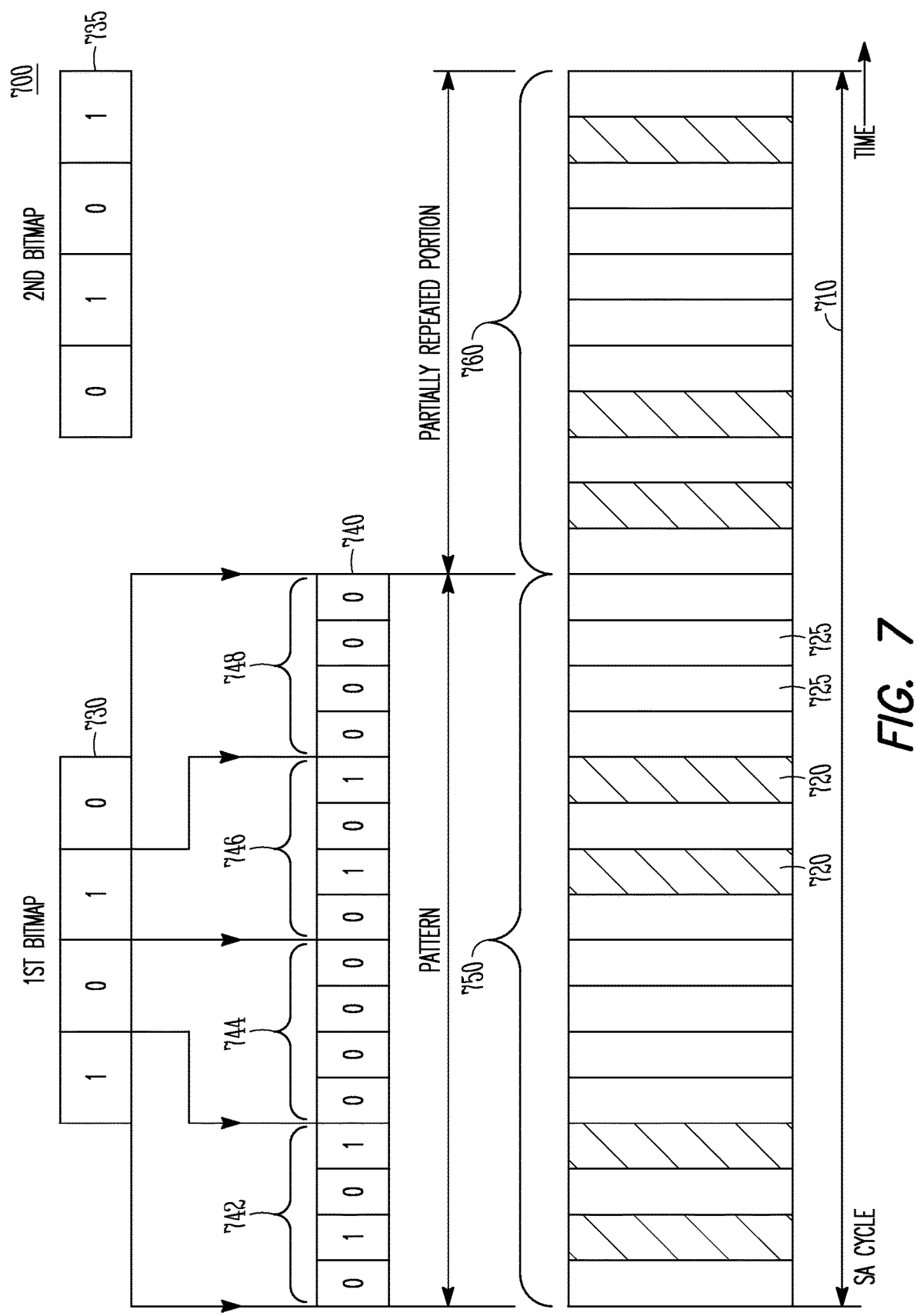
FIG. 7 illustrates an example of a D2D transmission according to an example time resource pattern for transmissions (T-RPT) in accordance with some embodiments.
Figure 8:
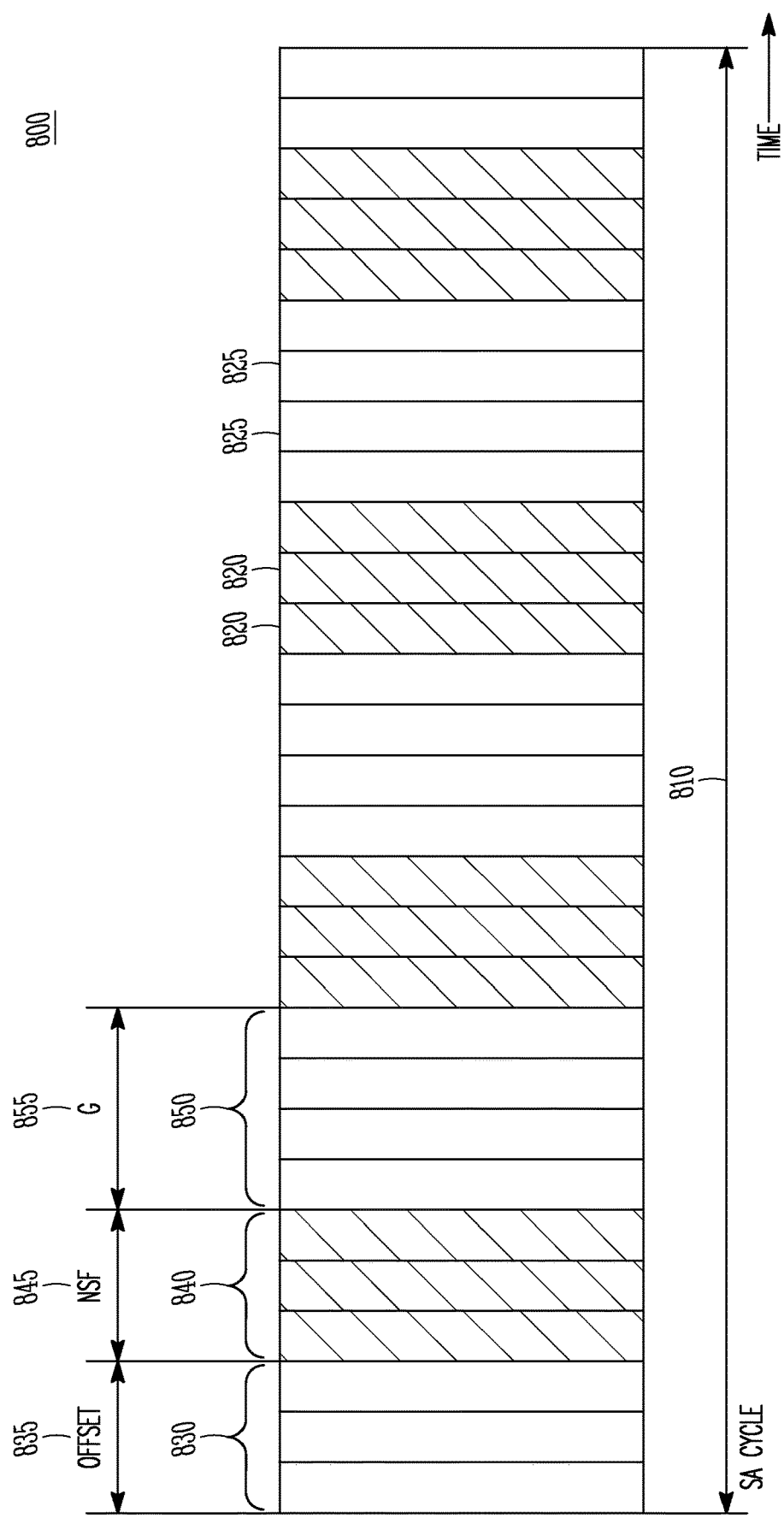
FIG. 8 illustrates another example of a D2D transmission according to another example T-RPT in accordance with some embodiments.
Figure 9:
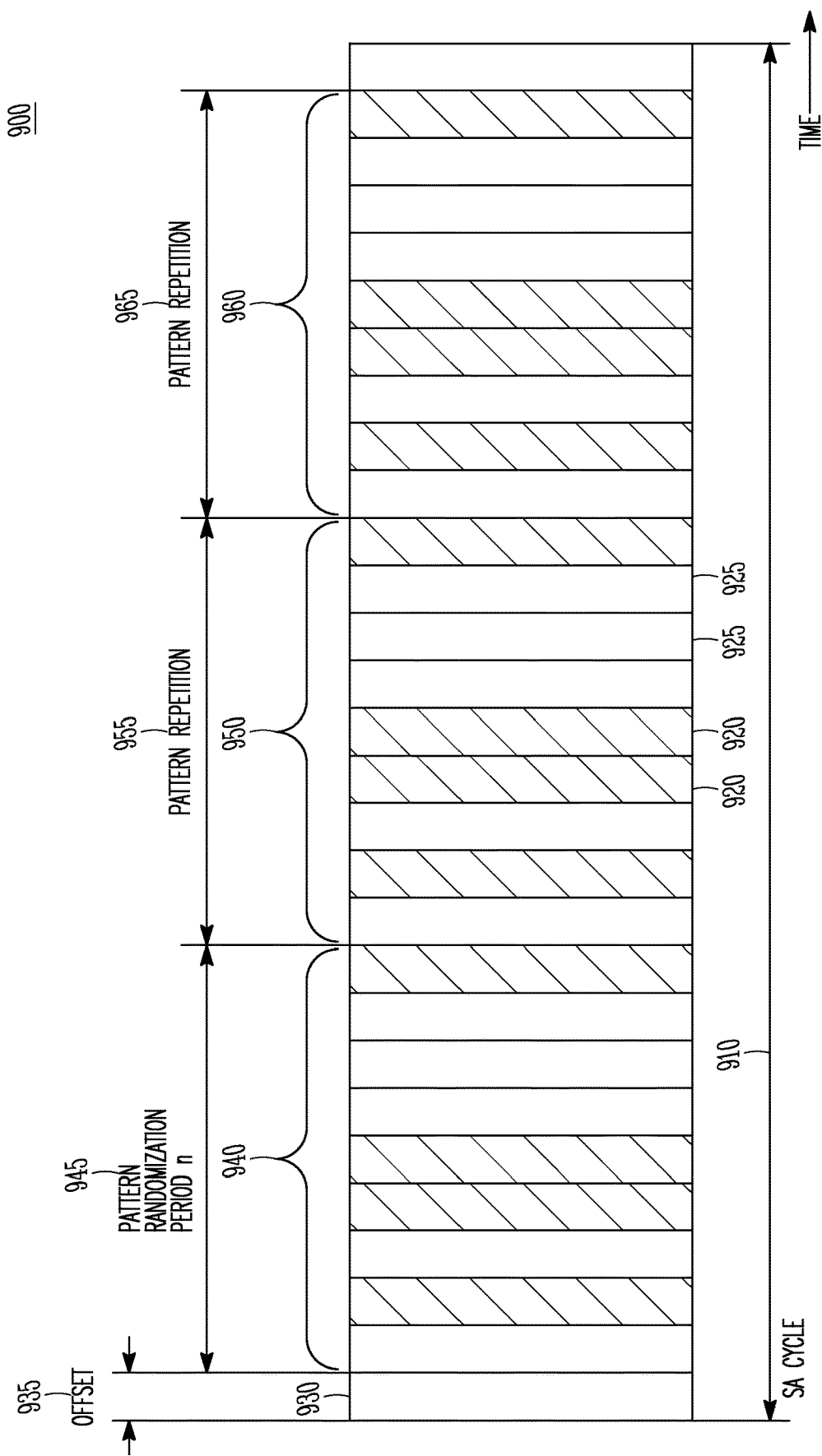
FIG. 9 illustrates another example of a D2D transmission according to another example T-RPT in accordance with some embodiments.
Figure 10:
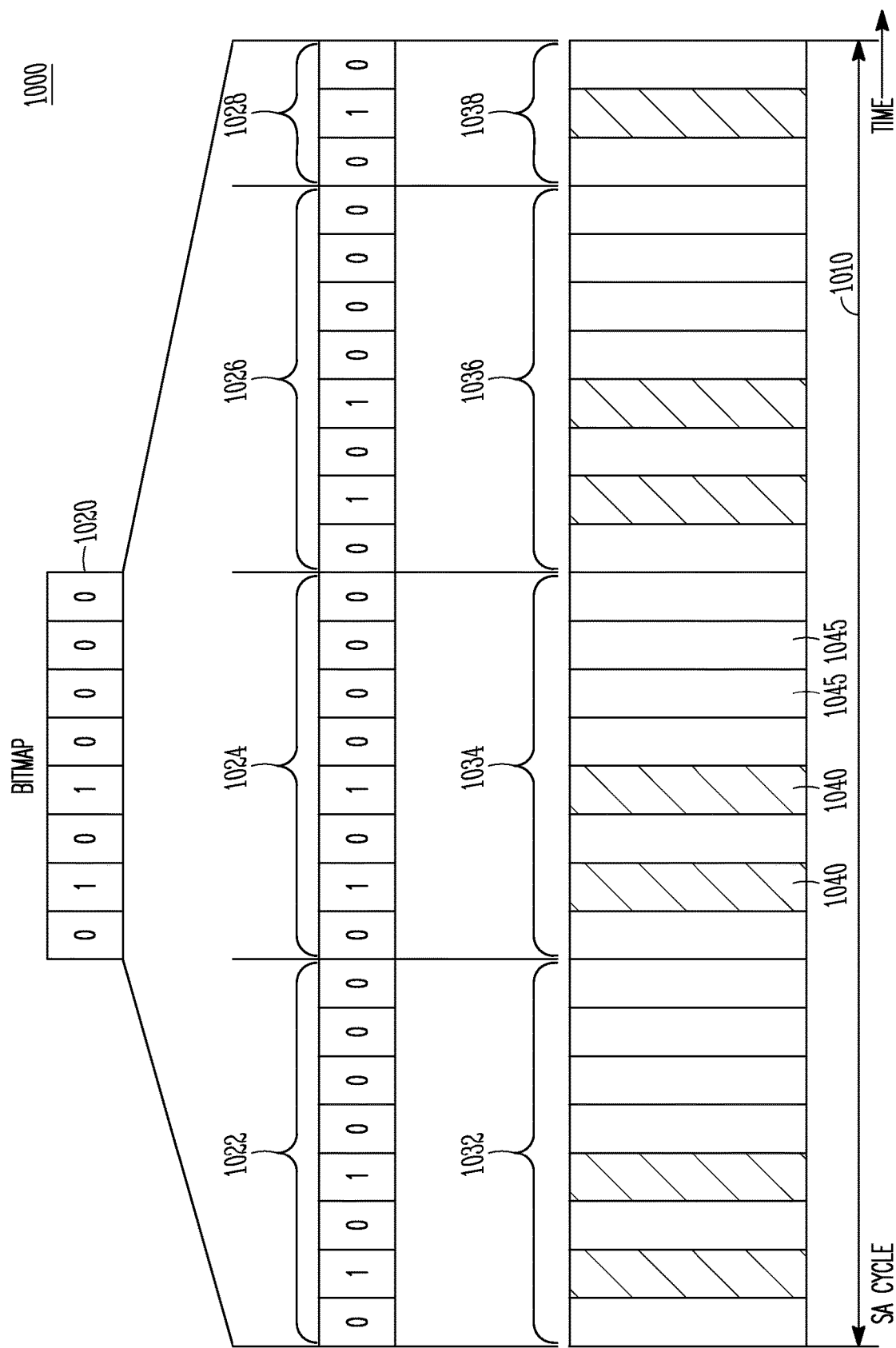
FIG. 10 illustrates another example of a D2D transmission according to another example T-RPT in accordance with some embodiments.

Several examples of determination and/or generation of the TTIs and/or T-RPT for the D2D transmission will now be presented. FIG. 7 illustrates an example of a D2D transmission according to an example time resource pattern for transmissions (T-RPT) in accordance with some embodiments. FIG. 8 illustrates another example of a D2D transmission according to another example T-RPT in accordance with some embodiments. FIG. 9 illustrates another example of a D2D transmission according to another example T-RPT in accordance with some embodiments. FIG. 10 illustrates another example of a D2D transmission according to another example T-RPT in accordance with some embodiments. It should be noted that these examples in FIGS. 7-10 and other examples presented are not limiting, as other suitable techniques may be used to determine and/or generate a group, sequence or pattern of TTIs to be used for the D2D transmission. Furthermore, any suitable technique may be used for communication of that information to the receiving UE 102.

As an example, the T-RPT may be based at least partly on a selected bitmap included in a group of predetermined bitmaps. As an example, bit positions of the bitmaps may be mapped to consecutive TTIs of the group of D2D TTIs to indicate whether the TTIs are included in the T-RPT. That is, a particular bit position of the bitmap may be mapped to a particular TTI in the group of D2D TTIs. The value of the bitmap at that particular bit position may indicate whether the particular TTI is included in the T-RPT. In some embodiments, the bitmaps included in the group of predetermined bitmaps may be mapped to a group of bitmap indexes. Accordingly, the SA control message may include the bitmap index for the selected bitmap to inform the receiving UE 102 of the selected bitmap. For instance, the bitmap index for the selected bitmap may be included as a T-RPT generation parameter 610 in the SA control message 600 of FIG. 6.

In some cases, the selected bitmap may be selected randomly from the group of predetermined bitmaps, such as a selection according to a uniform probability distribution for the group. This example is not limiting, however, as the bitmap to be used for the determination of the T-RPT may be selected based on performance factors or other factors. For instance, the bitmap may be selected to reduce or minimize a number of potential collisions with other transmissions.

In some embodiments, the T-RPT may be generated, or may be based on, one or more repetitions of the selected bitmap. For instance, the bitmap may be repeated according to a number of repetitions to produce an expanded bitmap, and values of the expanded bitmap at a particular bit position may indicate whether a particular TTI is included in the T-RPT.

Referring to the example scenario 1000 shown in FIG. 10, for the SA cycle 1010, the bitmap 1020 may be used to generate the T-RTP. As described previously, the bitmap 1020 may be selected from a group of predetermined bitmaps (randomly or otherwise), although embodiments are not limited as such. In the example scenario 1000, the bitmap 1020 may be used to produce one or more copies, versions or repetitions of the bitmap, labeled 1022, 1024, and 1026 in this case. In addition, a portion of the bitmap 1020 may be used to form the block 1028, which may be considered an "extra portion" that may be used in addition to the repetitions 1022, 1024, 1026 such that a combined length of the blocks 1022-1028 is equal to the number of TTIs in the SA cycle 1010. In some cases, such an extra portion may not be needed. For instance, the number of TTIs in the SA cycle 1010 may be a multiple of the length (in TTIs) of the bitmap 1020.

As shown in FIG. 10, the blocks 1022-1028 may be used to determine whether or not corresponding TTIs in the groups of TTIs 1032, 1034, 1036, and 1038 are included in the T-RPT. In the example shown in FIG. 10, a value of "1" in the blocks 1022-1028 may indicate that a corresponding TTI is included in the T-RPT while a value of "0" in the blocks 1022-1028 may indicate that a corresponding TTI is excluded from the T-RPT. Accordingly, the TTIs included in the T-RTP may be demarcated (within blocks 1032-1038) according to the pattern 1040 when included and may be demarcated according to an empty box 1045 when excluded. For instance, the second and fourth positions of the bitmap 1024 have a value of "1" and therefore the corresponding second and fourth TTIs in the group of TTIs 1034 are included in the T-RPT (demarcated according to the pattern 1040). The remaining positions of the bitmap 1024 have a value of "0" and therefore the corresponding positions in the group of TTIs 1034 are excluded from the T-RPT (demarcated according to the empty box 1045). The TTIs within the blocks 1032-1038 that are demarcated according to the pattern 1040 may comprise the T-RPT.

In some embodiments, the SA control message may include the bitmap 1020 (which may be referenced by an index or otherwise). In some embodiments, the SA control message may include a number of repetitions of the bitmap to be used in forming the T-RPT. For instance, the example SA control message 600 shown in FIG. 6 may indicate the bitmap and/or the bitmap index and/or the number of repetitions as T-RPT generation parameters 610. It should be noted that embodiments are not limited to the example bitmap 1020 in terms of length or pattern. In addition, the length of the SA cycle 1010 and its length with respect to the bitmap 1020 is also not limiting.

As another example, the T-RPT may be based on or generated by an expanded bitmap that is based on a replication bitmap and the selected bitmap. Bit positions of the replication bitmap may be mapped to consecutive groups of bit positions in the expanded bitmap. Values of the replication bitmap may indicate whether the consecutive groups of bit positions in the expanded bitmap include the selected bitmap or a group of zeros. The value of zero at a bit position of the expanded bitmap may indicate exclusion, in the T-RPT, of a TTI mapped to the bit position. In addition, the value of one at the bit position may indicate inclusion of the TTI in the T-RPT.

Referring to the example scenario 700 shown in FIG. 7, for the SA cycle 710, the first bitmap 730 may serve as the replication bitmap while the second bitmap 735 may serve as the selected bitmap in this example. Accordingly, the expanded bitmap 740 may be produced. In the example shown in FIG. 7, the first bit position of the replication bitmap 730 has a value of "1" and therefore the first group of TTIs 742 in the expanded bitmap 740 includes the selected bitmap 735. The second bit position of the replication bitmap 730 has a value of "0" and therefore the second group of TTIs 744 in the expanded bitmap 740 includes a group of zeros of the same length as the selected bitmap 735. The third bit position of the replication bitmap 730 has a value of "1" and therefore the third group of TTIs 742 in the expanded bitmap 740 includes the selected bitmap 735. The fourth bit position of the replication bitmap 730 has a value of "0" and therefore the fourth group of TTIs 744 in the expanded bitmap 740 includes a group of zeros of the same length as the selected bitmap 735. The pattern 750 is therefore produced by the expanded bitmap 740. It should be noted that the TTIs included in the T-RTP (demarcated according to the pattern 720) correspond to bit positions of the expanded bitmap 740 that include a value of one. TTIs that are excluded from the T-RTP (demarcated with an empty box 725) correspond to bit positions of the expanded bitmap 740 that include a value of zero.

In the example shown in FIG. 7, the pattern 750 is partially repeated as the portion 760, which may be performed when the length of the pattern 750 is less than the length of the SA cycle 710. In some cases, the pattern 750 may be repeated an integer number of times such that the repeated result fits in the SA cycle 710. A portion such as 760 of an appropriate length may be used when the repetitions of the pattern 750 are less than the length of the SA cycle 710. It should be noted that embodiments are not limited to the example bitmaps 730, 735 in terms of length or pattern. In addition, the length of the SA cycle 710 and its length with respect to the bitmaps 730, 735 is also not limiting.

In some embodiments, the SA control message may include the first bitmap 730 and/or the second bitmap 735 (which may be referenced by indexes or otherwise). For instance, the example SA control message 600 shown in FIG. 6 may indicate the selected bitmap and/or replication bitmap (through indexes or otherwise) as T-RPT generation parameters 610.

As another example, the T-RPT may include one or more groups of consecutive TTIs separated by one or more gaps of TTIs. Accordingly, the T-RPT may be based on a number of consecutive TTIs in the groups of consecutive TTIs (such as a TTI length indicator) and may be further based on a number of TTIs between such groups (such as a TTI gap indicator). In some cases, the first consecutive group of TTIs may be offset from the beginning of the SA cycle by a number of TTIs (such as a TTI offset indicator). Accordingly, the SA control message may include any or all of these indicators (TTI length indicator, TTI gap indicator, TTI offset indicator). For instance, the example SA control message 600 shown in FIG. 6 may include any or all of these indicators as T-RPT generation parameters 610.

Referring to the example scenario 800 shown in FIG. 8, for the SA cycle 810, consecutive groups of TTIs included in the T-RPT (demarcated according to the pattern 820) may be separated by gaps of TTIs that are excluded from the T-RPT (demarcated according to the empty box 825). The T-RPT may include a group of TTIs 830 in the beginning of the SA cycle 810 according to the offset 835. The group of consecutive TTIs 840 (and others shown) may be of length equal to the value Nsf 845. A gap of TTIs 850 (and others shown) may be of length equal to the value G 855. As shown in FIG. 8, the pattern of a consecutive group of included TTIs (like 840) followed by a group of excluded TTIs (like 850) may be repeated to fill up the SA cycle 810. If necessary, a portion of the pattern may be used at the end of the SA cycle 810. It should be noted that embodiments are not limited to the example values 835, 845, 855 used in the scenario 800 and are also not limited to the length of the SA cycle 810 shown in FIG. 8. As an example, the SA control message may include the offset 835 and/or the length Nsf 845 and/or the gap value G 855. For instance, the example SA control message 600 shown in FIG. 6 may indicate any or all of these parameters as T-RPT generation parameters 610.

As another example, the T-RPT may be based at least partly on a number of TTIs to be used for the transmission of the data payload, a number of TTIs included in the SA cycle, and a seed value. These parameters may be included in the SA control message, in some cases, to enable the receiving UE 102 to determine and/or generate the T-RPT. For instance, the example SA control message 600 shown in FIG. 6 may include any or all of these parameters as T-RPT generation parameters 610. The seed value may be input to a function such as a pseudo-random number generator, although not limited as such.

Referring to the example scenario 900 shown in FIG. 9, for the SA cycle 910, a randomization pattern 940 of period or length given by 945 may be generated. The pattern 940 may be repeated as 950 and 960 during the SA cycle 910. The randomization pattern 940 may include one or more TTIs included in the T-RPT (demarcated according to the pattern 920) and may include one or more TTIs that are excluded from the T-RPT (demarcated according to the empty box 925). The T-RPT may include a group of TTIs 930 in the beginning of the SA cycle 910 according to the value of the offset 935. As shown in FIG. 9, the randomization pattern 940 of TTIs may be repeated to fill up the SA cycle 910. If necessary, a portion of the pattern may be used at the end of the SA cycle 910. It should be noted that embodiments are not limited to the example values 945, 955, 965 used in the scenario 900 and are also not limited to the length of the SA cycle 910 shown in FIG. 9. As an example, the SA control message may include the randomization pattern 940 and/or other parameters (such as a seed value) that may be used to generate the pattern. For instance, the example SA control message 600 shown in FIG. 6 may indicate any or all of these parameters as T-RPT generation parameters 610.

Returning to the method 500, at operation 530, the data payload may be transmitted during the TTIs indicated in the SA control message. In some cases, the data payload may be transmitted according to the T-RPT indicated in the SA control message. As previously described, any number of transmitter functions may be applied to one or more data packets to produce one or more groups of symbols. The groups of symbols may be mapped to the TTIs as part of operation 530.

In some embodiments of an eNB 104, the eNB 104 may transmit control messages to one or more UEs 102 for D2D communication sessions between the UEs 102. The transmitted control message may include messages such as those described regarding operations 505-515 or other messages. The transmissions may include dedicated control messages and/or broadcast control messages. The eNB 104 may be configured to operate in a network (such as a 3GPP network) and may communicate with UEs 102 that are also configured to operate in the network. It should be noted that some techniques and/or operations described in other embodiments (such as those for the UE 102 in the method 500) may be applicable to some of these embodiments of the eNB 104.

As an example, one or more RRC messages may be transmitted by the eNB 104 to indicate time resources and channel resources that may be reserved, allocated for or configured to support D2D transmissions of SA control messages by UEs 102. The SA control messages, such as the example SA control message 600 in FIG. 6, may enable D2D communication between one or more of the UEs 102. As another example, one or more RRC messages may be transmitted by the eNB 104 to indicate D2D TTIs that may be reserved, allocated for or configured to support D2D transmissions of data payloads by the UEs 102. As another example, one or more RRC messages may be transmitted by the eNB 104 to indicate information, such as a group of predetermined bitmaps previously described and/or bitmap indexes for the bitmaps, that may enable the UEs 102 to determine TTIs to be used for the D2D transmissions of the data payloads. For instance, a time resource pattern for transmission (T-RPT) determined by a transmitting UE 102 may indicate a sequence of D2D TTIs to be used by the transmitting UE 102 for a D2D transmission of a data payload. One or more T-RPT parameters (such as a bitmap index or others previously described) may be transmitted in an SA control message (such as 600 or other) by the transmitting UE 102.

In some embodiments, various information and/or parameters transmitted in the RRC messages may be transmitted in separate RRC messages and/or combined RRC messages. As an example, one or more RRC messages may include the time resources and channel resources for the SA control messages and may also include information related to the D2D TTIs. As another example, some of those messages may also include information and/or parameters related to the T-RPT determination, such as the group of bitmaps or other parameters previously described.

In some embodiments of a receiving UE 102, a receiving UE 102 may receive control messages such as the SA control message described at operation 525 or other control messages. The control messages may be received as part of a D2D communication, or directly from another UE 102. In some embodiments of a receiving UE 102, data payloads such as those described at operation 525 may be received as part of the D2D communication. The receiving UE 102 and the other UE 102 may be configured to operate in a network (such as a 3GPP network). Both UEs 102 may also communicate with an eNB 104 that is also configured to operate in the network, and may receive control messages from the eNB 104 for the D2D communication as previously described. In some embodiments, the UE 102 may be configured to operate as a transmitting UE 102 and/or receiving UE 102. That is, the UE 102 may be configured to perform operations related to both the transmission and the reception of data payloads as part of the D2D communication. In some cases, the UE 102 may be configured to operate as both a transmitting UE 102 and a receiving UE 102 simultaneously. In some cases, the UE 102 may be configured to operate as either a transmitting UE 102 or as a receiving UE 102, but may not necessarily be configured to operate as both a transmitting UE 102 and a receiving UE 102 simultaneously.

An example of an apparatus for a User Equipment (UE) is disclosed herein. The apparatus may comprise transceiver circuitry and hardware processing circuitry. The hardware processing circuitry may configure the transceiver circuitry to transmit a scheduling assignment (SA) control message that indicates one or more time transmission intervals (TTIs) of an SA cycle, the indicated TTIs to be used for a device-to-device (D2D) transmission of a data payload by the UE to a receiving UE during the SA cycle. The hardware processing circuitry may configure the transceiver circuitry to transmit the data payload during the TTIs indicated in the SA control message. The TTIs used for the transmission of the data payload may be included in a group of D2D TTIs reserved for D2D transmissions. The SA control message may be transmitted in time resources and channel resources that are reserved for SA control message transmissions.

In some examples, the TTIs used for the transmission of the data payload may be included in a time resource pattern for transmission (T-RPT) that indicates a sequence of TTI indexes. In some examples, the T-RPT may be based at least partly on a selected bitmap included in a group of predetermined bitmaps and bit positions of the bitmaps may be mapped to consecutive TTIs of the group of D2D TTIs to indicate whether the TTIs are included in the T-RPT. In some examples, the group of predetermined bitmaps may be mapped to a group of bitmap indexes and the SA control message may include one of the group of bitmap indexes to indicate the selected bitmap. In some examples, the T-RPT may be further based at least partly on one or more repetitions of the selected bitmap.

In some examples, the T-RPT may be further based at least partly on an expanded bitmap that is based on a replication bitmap and the selected bitmap. Bit positions of the replication bitmap may be mapped to consecutive groups of bit positions in the expanded bitmap. Values of the replication bitmap may indicate whether the consecutive groups of bit positions in the expanded bitmap include the selected bitmap or a group of zeros. The value of zero at a bit position of the expanded bitmap may indicate exclusion, in the T-RPT, of a TTI mapped to the bit position.

In some examples, the selected bitmap may be selected randomly from the group of predetermined bitmaps. In some examples, the hardware processing circuitry may further configure the transceiver circuitry to receive one or more radio resource control (RRC) messages that indicate the group of predetermined bitmaps. In some examples, the T-RPT may include one or more groups of consecutive TTIs. The SA control message may include a TTI length indicator for the groups of consecutive TTIs and may further include a TTI gap indicator for a number of TTIs between the groups of consecutive TTIs.

In some examples, the T-RPT may be based at least partly on a number of TTIs to be used for the transmission of the data payload, a number of TTIs included in the SA cycle, and a seed value. The SA control message may include the number of TTIs to be used for the transmission of the data payload, the number of TTIs included in the SA cycle, and the seed value. In some examples, the transmission of the SA control message may enable the receiving UE to determine the T-RPT. In some examples, the hardware processing circuitry may further configure the transceiver circuitry to receive, from an Evolved Node-B (eNB) configured to operate in a network, one or more control messages that indicate the group of D2D TTIs and may further indicate the time resources and the channel resources that are reserved for the SA control message transmissions. The D2D TTIs may be reserved, by the network, for D2D transmissions and the time resources and channel resources reserved for SA control message transmissions may be reserved by the network.

In some examples, the UE may be configured to operate according to a Third Generation Partnership Project (3GPP) protocol. In some examples, the apparatus may further include one or more antennas coupled to the transceiver circuitry for the transmission of the SA control message and the transmission of the data payload.

An example of a non-transitory computer-readable storage medium that stores instructions for execution by one or more processors to perform operations for communication by a User Equipment (UE) is also disclosed herein. The operations may configure the one or more processors to receive, from an Evolved Node-B (eNB) configured to operate in a network, one or more control messages to indicate a group of device-to-device (D2D) time transmission intervals (TTIs) that are reserved by the network for D2D transmissions between UEs. The operations may further configure the one or more processors to transmit a scheduling assignment (SA) control message to indicate a D2D transmission of a data payload by the UE to a receiving UE. The operations may configure the one or more processors to transmit the data payload according to a time resource pattern for transmission (T-RPT) indicated in the SA control message. The T-RPT may indicate a sequence of TTIs included in the D2D TTIs.

In some examples, the SA control message may be transmitted in time resources and channel resources that are reserved, by the network, for SA control message transmissions. In some examples, the T-RPT may be based at least partly on a selected bitmap included in a group of predetermined bitmaps. Bit positions of the bitmaps may be mapped to consecutive TTIs of the group of D2D TTIs to indicate whether the TTIs are included in the T-RPT. In some examples, the group of predetermined bitmaps may be mapped to a group of bitmap indexes. The SA control message may include one of the group of bitmap indexes to indicate the selected bitmap.

In some examples, the selected bitmap may be selected randomly from the group of predetermined bitmaps. In some examples, the operations may further configure the one or more processors to receive one or more radio resource control (RRC) messages that indicate the group of predetermined bitmaps.

An example of a method of communication performed by a User Equipment (UE) is also disclosed herein. The method may comprise transmitting a scheduling assignment (SA) control message that indicates one or more time transmission intervals (TTIs) of an SA cycle, the indicated TTIs to be used for a device-to-device (D2D) transmission of a data payload by the UE to a receiving UE during the SA cycle. The method may further comprise transmitting the data payload during the TTIs indicated in the SA control message. The TTIs used for the transmission of the data payload may be included in a group of D2D TTIs reserved for D2D transmissions. The SA control message may be transmitted in time resources and channel resources that are reserved for SA control message transmissions. In some examples, the TTIs used for the transmission of the data payload may be included in a time resource pattern for transmission (T-RPT) that indicates a sequence of TTI indexes.

An example of an apparatus for an Evolved Node-B (eNB) is also disclosed herein. The apparatus may comprise transceiver circuitry and hardware processing circuitry. The hardware processing circuitry may configure the transceiver circuitry to transmit a first radio resource control (RRC) message that indicates time resources and channel resources that are reserved for device-to-device (D2D) transmissions of scheduling assignment (SA) control messages by a group of User Equipments (UEs). The hardware processing circuitry may further configure the transceiver circuitry to transmit a second RRC message that indicates a group of bitmaps for usage by a transmitting UE to determine a group of time transmission interval (TTI) indexes for a D2D transmission of a data payload by the transmitting UE to a receiving UE. Bit positions of the bitmaps may be mapped to consecutive TTIs of a group of D2D TTIs reserved for D2D transmission of data payloads by the group of UEs.

In some examples, the second RRC message may further indicate a group of bitmap indexes for the group of bitmaps. The bitmap indexes may be for inclusion by the transmitting UE in an SA control message to indicate, to the receiving UE, the group of TTI indexes for the D2D transmission of the data payload. In some examples, the hardware processing circuitry may further configure the transceiver circuitry to transmit a third RRC message to indicate the group of D2D TTIs. In some examples, the Evolved Node-B (eNB) may be configured to operate in a Third Generation Partnership Project (3GPP) network. The time resources and channel resources that are reserved for the D2D transmissions of SA control messages may be reserved by the 3GPP network. The D2D TTIs may be reserved, by the 3GPP network, for the D2D transmissions of the data payloads by the group of UEs. In some examples, the apparatus may further include one or more antennas coupled to the transceiver circuitry for the transmission of the RRC control messages.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a User Equipment (UE) the apparatus comprising transceiver circuitry and hardware processing circuitry, the hardware processing circuitry to configure the transceiver circuitry to:

receive a radio-resource control (RRC) message from a base station, a RRC message indicating subframes that are available for Device-Device (D2D) communication, the RRC message including a scheduling assignment (SA) cycle length and an indication of a group of a bitmap patterns used for Time Resource Pattern of Transmission (T-RPT) generation from a set of predetermined bitmap patterns including a plurality of repetition periods, wherein a respective bitmap pattern relates to a subset of the subframes available for D2D communication;

select an index of a bitmap pattern from the group of bitmap patterns;

encode information for transmission to another UE indicating the selected bitmap pattern and a repetition period of the selected bitmap pattern; and generate a signal for a D2D transmission for direct transmission to the other UE, in one or more of the subframes of the subset of subframes corresponding to a T-RPT generated using the selected bitmap pattern and the repetition period of the selected bitmap pattern, wherein the D2D transmission includes data for the other UE.

2. The apparatus of claim 1, the hardware processing circuitry to configure the transceiver circuitry to:

receive one or more control messages indicating time resources for transmission of scheduling assignment (SA) control messages.

3. The apparatus of claim 1, the hardware processing circuitry to configure the transceiver circuitry to:

generate a scheduling assignment (SA) control message for transmission to the other UE, the SA control message indicating the one or more of the subframes of the subset to be used for the D2D transmission.

4. The apparatus of claim 1, wherein the one or more of the subframes of the subset used for the D2D transmission are included in a group of subframes reserved for D2D transmissions.

5. The apparatus of claim 1, wherein:
the indication of the group of bitmap patterns is contained in an information element (IE), and
the IE further indicates the length of a scheduling assignment (SA) cycle and a length of the SA cycle with respect to at least one of the bitmap patterns.

6. The apparatus of claim 1, wherein the RRC message indicates a set of available repetition periods for the group of bitmap patterns.

7. The apparatus of claim 1, wherein the RRC message indicates a number of subframes per packet data unit (PDU) and a number of retransmissions for one PDU.

8. A non-transitory computer-readable storage medium that stores instructions for execution by processing circuitry of a user equipment (UE) to configure the UE to perform operations to:

receive, from a base station, configured to operate in a network, a radio-resource control (RRC) message indicating subframes that are available for Device-to-Device (D2D) communication, the RRC message including a scheduling assignment (SA) cycle length and an indication of a group of a bitmap patterns used for Time Resource Pattern of Transmission (T-RPT) generation from a set of predetermined bitmap patterns including a plurality of repetition periods, wherein a respective bitmap pattern relates to a subset of the subframes available for D2D communication;

select an index of a bitmap pattern from the group of bitmap patterns;

encode information for transmission to another UE indicating the selected bitmap pattern and a repetition period of the selected bitmap pattern; and generate a signal for a D2D transmission, for direct transmission to the other UE, in one or more of the subframes of the subset of subframes corresponding to a T-RPT generated using the selected bitmap pattern and the repetition period of the selected bitmap pattern, wherein the D2D transmission includes data for the other UE.

9. The non-transitory computer-readable storage medium of claim 8, wherein the instructions further configure the UE to perform operations to:

receive one or more control messages indicating time resources for transmission of scheduling assignment (SA) control messages.

10. The non-transitory computer-readable storage medium of claim 8, wherein the instructions further configure the UE to perform operations to:

generate a scheduling assignment (SA) control message for transmission to the other UE, the SA control message indicating the one or more of the subframes of the subset to be used for the D2D transmission.

11. The non-transitory computer-readable storage medium of claim 8, wherein:

the indication of the group of bitmap patterns is contained in an information element (IE), and the IE further indicates the length of a scheduling assignment (SA) cycle and a length of the SA cycle with respect to at least one of the bitmap patterns.

12. The non-transitory computer-readable storage medium of claim 8, wherein the RRC message indicates a set of available repetition periods for the group of bitmap patterns.

13. The non-transitory computer-readable storage medium of claim 8, wherein the RRC message indicates a number of subframes per packet data unit (PDU) and a number of retransmissions for one PDU.

14. A method for performing Device-Device (D2D) communication, the method comprising:

receiving a radio-resource control (RRC) message from a base station, a RRC message indicating subframes that are available for D2D communication, the RRC message including a scheduling assignment (SA) cycle length and an indication of a group of a bitmap patterns used for Time Resource Pattern of Transmission (T-RPT) generation from a set of predetermined bitmap patterns including a plurality of repetition periods, wherein a respective bitmap pattern relates to a subset of the subframes available for D2D communication;

selecting an index of a bitmap pattern from the group of bitmap patterns;

encoding information for transmission to another UE indicating the selected bitmap pattern and a repetition period of the selected bitmap pattern; and generating a signal for a D2D transmission for direct transmission to the other UE, in one or more of the subframes of the subset of subframes corresponding to a T-RPT generated using the selected bitmap pattern and the repetition period of the selected bitmap pattern, wherein the D2D transmission includes data for the other UE.

15. The method of claim 14, further comprising:
receiving one or more control messages indicating time resources for transmission of SA control messages.

16. The method of claim 14, further comprising:
generating a SA control message for transmission to the other UE, the SA control message indicating the one or more of the subframes of the subset to be used for the D2D transmission.

17. The method of claim 14, wherein the one or more of the subframes of the subset used for the D2D transmission are included in a group of subframes reserved for D2D transmissions.

18. The method of claim 14, wherein:
the indication of the group of bitmap patterns is contained in an information element (IE), and
the IE further indicates the length of a SA cycle and a length of the SA cycle with respect to at least one of the bitmap patterns.

19. The method of claim 14, wherein the RRC message indicates a set of available repetition periods for the group of bitmap patterns.

20. The method of claim 14, wherein the RRC message indicates a number of subframes per packet data unit (PDU) and a number of retransmissions for one PDU.

* * * * *